US010789656B2

(12) United States Patent
Guo et al.

(10) Patent No.: US 10,789,656 B2
(45) Date of Patent: *Sep. 29, 2020

(54) PROVIDING AND MANAGING PRIVACY SCORES

(71) Applicant: International Business Machines Corporation, Armonk, NY (US)

(72) Inventors: Sherry X. Guo, Fremont, CA (US); Tony Sun, Pleasanton, CA (US); Dwayne Lorenzo Richardson, San Francisco, CA (US); Eugene Michael Maximilien, San Jose, CA (US); Kun Liu, San Jose, CA (US); Tyrone Wilberforce Andre Grandison, Altamonte Springs, CA (US)

(73) Assignee: International Business Machines Corporation, Armonk, NY (US)

( * ) Notice: Subject to any disclaimer, the term of this patent is extended or adjusted under 35 U.S.C. 154(b) by 547 days.

This patent is subject to a terminal disclaimer.

(21) Appl. No.: 15/618,477

(22) Filed: Jun. 9, 2017

(65) Prior Publication Data

US 2017/0278197 A1    Sep. 28, 2017

Related U.S. Application Data

(63) Continuation of application No. 12/533,694, filed on Jul. 31, 2009, now Pat. No. 9,704,203.

(51) Int. Cl.
*G06F 7/00* (2006.01)
*G06F 17/00* (2019.01)
(Continued)

(52) U.S. Cl.
CPC ............. *G06Q 50/01* (2013.01); *G06Q 10/10* (2013.01)

(58) Field of Classification Search
CPC ............................... G06Q 50/01; G06Q 10/10
(Continued)

(56) References Cited

U.S. PATENT DOCUMENTS 3,737,733 A * 6/1973 Lin ................... G07C 9/00666
361/171
5,614,927 A    3/1997 Gifford et al.
(Continued)

FOREIGN PATENT DOCUMENTS

CN    101063968 A    10/2007
CN    102428475 A    4/2012
(Continued)

OTHER PUBLICATIONS

Adams, "A Classification for Privacy Techniques", (2006) U of Ottawa Law & Tech Jml., 3:1, pp. 35-52.
(Continued)

*Primary Examiner* — Pavan Mamillapalli
(74) *Attorney, Agent, or Firm* — Reza Sarbakhsh (57) ABSTRACT

Methods for providing a privacy setting for a target user relative to relationships with a number of other users in a social network utilizing an electronic computing device are presented, the method including: causing the electronic computing device to retrieve a current privacy setting for a common profile item, where the common profile item corresponds with the target user and each of the number of other users, and where the common profile item is one of a number of common profile items; causing the electronic computing device to calculate a pseudo-common profile item sensitivity value for the common profile item based on the current privacy settings of the target user and the number of other users; causing the electronic computing device to calculate a final common profile item sensitivity value for the common profile item based on the current privacy setting.

20 Claims, 7 Drawing Sheets

(51) Int. Cl.
*G06Q 50/00* (2012.01)
*G06Q 10/10* (2012.01)

(58) Field of Classification Search
USPC .......................................................... 707/9
See application file for complete search history.

(56) References Cited

U.S. PATENT DOCUMENTS

| | | | |
|---|---|---|---|
| 6,073,196 A | 6/2000 | Goodrum et al. | |
| 6,243,613 B1 | 6/2001 | Desiraju et al. | |
| 6,324,646 B1 | 11/2001 | Chen et al. | |
| 6,438,666 B2 | 8/2002 | Cassagnol et al. | |
| 6,505,048 B1* | 1/2003 | Moles | H04W 4/029 |
| | | | 455/456.1 |
| 6,708,203 B1* | 3/2004 | Makar | G06F 3/0489 |
| | | | 707/999.006 |
| 6,904,417 B2 | 6/2005 | Clayton et al. | |
| 6,907,465 B1* | 6/2005 | Tsai | G06Q 30/02 |
| | | | 709/206 |
| 6,963,908 B1 | 11/2005 | Lynch et al. | |
| 6,968,334 B2 | 11/2005 | Salmenkaita et al. | |
| 7,162,451 B2 | 1/2007 | Berger et al. | |
| 7,216,169 B2 | 5/2007 | Clinton et al. | |
| 7,277,919 B1* | 10/2007 | Donoho | G06Q 30/02 |
| | | | 709/206 |
| 7,437,763 B2 | 10/2008 | Guo | |
| 7,496,751 B2 | 2/2009 | Jong et al. | |
| 7,765,257 B2 | 7/2010 | Chen et al. | |
| 7,949,611 B1 | 5/2011 | Nielsen et al. | |
| 8,026,918 B1 | 9/2011 | Murphy | |
| 8,234,688 B2* | 7/2012 | Grandison | G06Q 50/01 |
| | | | 705/319 |
| 8,763,136 B2* | 6/2014 | Li | G06F 16/9535 |
| | | | 726/26 |
| 8,782,691 B1 | 7/2014 | Noble et al. | |
| 9,294,738 B2* | 3/2016 | Ying | G08B 13/19684 |
| 9,319,356 B2* | 4/2016 | Odell | G06Q 10/107 |
| 9,377,991 B1* | 6/2016 | Rapport | G06F 16/40 |
| 9,704,203 B2 | 7/2017 | Grandison et al. | |
| 2002/0010015 A1 | 1/2002 | Acres | |
| 2002/0095585 A1* | 7/2002 | Scott | G06Q 10/10 |
| | | | 713/185 |
| 2002/0104015 A1* | 8/2002 | Barzilai | G06F 21/6245 |
| | | | 726/1 |
| 2002/0111972 A1 | 8/2002 | Lynch et al. | |
| 2003/0135504 A1* | 7/2003 | Elvanoglu | G06F 21/53 |
| | | | 707/999.1 |
| 2003/0153310 A1* | 8/2003 | Ishii | H04W 8/16 |
| | | | 455/435.1 |
| 2003/0159028 A1 | 8/2003 | Mackin et al. | |
| 2004/0093224 A1 | 5/2004 | Vanska et al. | |
| 2005/0256866 A1 | 11/2005 | Lu et al. | |
| 2006/0047605 A1* | 3/2006 | Ahmad | G06F 21/6245 |
| | | | 705/64 |
| 2006/0079249 A1* | 4/2006 | Shim | H04L 67/146 |
| | | | 455/456.1 |
| 2006/0123462 A1 | 6/2006 | Lunt et al. | |
| 2006/0173963 A1 | 8/2006 | Roseway et al. | |
| 2006/0248573 A1 | 11/2006 | Pannu et al. | |
| 2006/0248584 A1 | 11/2006 | Kelly et al. | |
| 2006/0294134 A1 | 12/2006 | Berkhim et al. | |
| 2007/0000569 A1 | 1/2007 | Wang | |
| 2007/0005695 A1 | 1/2007 | Chen et al. | |
| 2007/0073728 A1 | 3/2007 | Klein et al. | |
| 2007/0156614 A1 | 7/2007 | Flinn et al. | |
| 2007/0271379 A1 | 11/2007 | Carlton et al. | |
| 2007/0283171 A1 | 12/2007 | Breslin et al. | |
| 2008/0005778 A1 | 1/2008 | Chen et al. | |
| 2008/0016054 A1 | 1/2008 | Liska | |
| 2008/0028219 A1* | 1/2008 | Booth | H04L 9/3226 |
| | | | 713/171 |
| 2008/0046976 A1* | 2/2008 | Zuckerberg | H04L 63/102 |
| | | | 726/4 |
| 2008/0104679 A1 | 5/2008 | Craig | |
| 2008/0155534 A1 | 6/2008 | Boss et al. | |
| 2008/0155537 A1 | 6/2008 | Dinda et al. | |
| 2008/0189768 A1 | 8/2008 | Callahan et al. | |
| 2008/0235168 A1 | 9/2008 | Chan et al. | |
| 2009/0013413 A1 | 1/2009 | Vera et al. | |
| 2009/0070334 A1 | 3/2009 | Callahan et al. | |
| 2009/0248602 A1 | 10/2009 | Frazier | |
| 2009/0248680 A1 | 10/2009 | Kalavade | |
| 2009/0320090 A1* | 12/2009 | Hungerford | G06F 16/958 |
| | | | 726/1 |
| 2009/0320091 A1* | 12/2009 | Torres | G06F 21/6218 |
| | | | 726/1 |
| 2010/0024042 A1 | 1/2010 | Motahari et al. | |
| 2010/0235877 A1* | 9/2010 | Hu | H04W 12/0802 |
| | | | 726/1 |
| 2010/0257577 A1* | 10/2010 | Grandison | G06F 21/6245 |
| | | | 726/1 |
| 2010/0274815 A1 | 10/2010 | Vanasco | |
| 2010/0306834 A1 | 12/2010 | Grandison et al. | |
| 2010/0318571 A1 | 12/2010 | Pearlman et al. | |
| 2010/0325722 A1 | 12/2010 | Uchida | |
| 2011/0004922 A1 | 1/2011 | Bono et al. | |
| 2011/0023129 A1 | 1/2011 | Vernal et al. | |
| 2011/0289590 A1 | 11/2011 | Miettinen | |
| 2012/0240050 A1 | 9/2012 | Goldfeder et al. | |

FOREIGN PATENT DOCUMENTS

| | | |
|---|---|---|
| EP | 2077522 A1 | 8/2009 |
| JP | 2006146314 A | 6/2006 |
| JP | 2006309737 A | 11/2006 |
| JP | 2007233610 A | 9/2007 |
| JP | 2007328766 A | 12/2007 |
| JP | 2008097485 A | 4/2008 |
| JP | 2008519332 A | 6/2008 |
| JP | 5623510 B2 | 11/2014 |
| KR | 101599099 B1 | 2/2016 |
| TW | 200417880 A | 9/2004 |
| TW | 1245510 B | 12/2005 |
| TW | 1255123 B | 5/2006 |
| TW | 200818834 A | 4/2008 |
| TW | 200908618 A | 2/2009 |
| TW | 101505122 B1 | 3/2015 |
| WO | 2006115919 A2 | 11/2006 |
| WO | 2007015184 A2 | 2/2007 |
| WO | 2007148562 A1 | 12/2007 |
| WO | 2009033182 A1 | 3/2009 |
| WO | 2010133440 A2 | 11/2010 |

OTHER PUBLICATIONS

Advisory Action from U.S. Appl. No. 12/468,738, dated Jan. 27, 2015.
Appeal Brief from U.S. Appl. No. 12/468,738, dated Apr. 1, 2015.
Barnes, "A Privacy Paradox: Social Networking in the Unites States," vol. 11, No. 9-4, Sep. 2006, pp. 12, Retrieved From http://firstmonday.org/article/view/1394/1312.
DiGioia. et al., "Social Navigation as a Model for Usable Security", (Jul. 2005) Symp. on Usable Priv & Sec, Pittsburgh, PA, USA, pp. 6,
Final Office Action from U.S. Appl. No. 12/468,738, dated Aug. 19, 2011.
Final Office Action from U.S. Appl. No. 12/468,738, dated Nov. 10, 2014.
Grandison, U.S. Appl. No. 12/418,511, filed Apr. 3, 2009.
Gross, et al., "Information Revelation and Privacy in Online Social Networks (The Facebook Case)", ACM WPES Nov. 2005 (pre-proceedings version), Alexandria, VA, USA, pp. 11.
Lipford, et al., "Understanding Privacy Settings in Facebook with an Audience View", Charlotte NC USA, 2008, pp. 5.
Liu et al.—A Framework for Computing the Privacy Scores of Users in Online Social Networks. ACM Transactions on KnowledgeDiscovery from Data, vol. 5, No. 1, Article 6, Dec. 2010, pp. 30, http://dl.acm.org/citation.cfm?d=1870102.
Liu, et al., "Privacy-Preserving Data Analysis on Graphs and Social Networks", Ch. 1, 2008, pp. 22.

(56) References Cited

OTHER PUBLICATIONS

Lu et al., "Trust-Based Privacy Preservation for Peer-to-peer Data Sharing," May 2006, pp. 7, Retrieved From https://www.cs.purdue.edu/homes/bb/SKM-P2P-Stream.pdf.

Maximilien et ai, "Enabling Privacy as a Fundamental Construct for Social Networks", International Conference on Computational Science and Engineering, 2009, pp. 1015-1020.

Non-Final Office Action from U.S. Appl. No. 12/418,511, dated Sep. 23, 2011.

Non-Final Office Action from U.S. Appl. No. 12/468,738, dated Apr. 22, 2011.

Non-Final Office Action from U.S. Appl. No. 12/468,738, dated Jul. 25, 2014.

Notice of Allowance from U.S. Appl. No. 12/418,511, dated Feb. 2, 2012.

Notice of Allowance from U.S. Appl. No. 12/418,511, dated Mar. 23, 2012.

Squicciarini et ai, "Collective Privacy Management in Social Networks", Track: Security and Privacy Session: Web Privacy, 2009, pp. 521-530.

Tyrone W.A. Grandison, U.S. Appl. No. 12/468,738, filed May 19, 2009.

Walter et al., "A Model of a Trust-Based Recommendation System on a Social Network," Springer Science+Business Media, LLC, Oct. 2007, pp. 18, Retrieved From www.ppgia.pucpr.br/~fabricio/ftp/Aulas/Mestrado/AS/Artigos...Agente/trust.pdf.

Grandison, "Towards Privacy Propagation in the Social Web", IBM Almaden Research Center, 2008, 2 pages.

Wang et al., "Privacy Protection in Social Network Data Disclosure Based on Granular Computing", (Jul. 16-21, 2006), IEEE International Conference on Fuzzy Systems, Vancouver, BC (CA), pp. 5485-5491.

Zhou et al., "Preserving Privacy in Social Networks Against Neighborhood Attacks", School of Computing Science, Simon Fraser Univ., Burnaby, BC (CA), Apr. 7, 2008, 10 pages.

Myers et al., "Protecting Privacy Using the Decentralized Label Model", (Oct. 2000), ACM Trans. on Software Eng. & Methodol., vol. 9, No. 4, pp. 410-442.

Howe, "The Problem with Privacy Policies & 'Industry Self-Regulation'", printed on Mar. 26, 2019, 23 pages, http://www.spywarewarrior.com/uiuc/priv-pol.htm.

International Search Report and Written Opinion, International Application No. PCT/EP2010/055854, International Filing Date: Apr. 29, 2010, dated Dec. 6, 2010, 9 pages.

\* cited by examiner

PROVIDING AND MANAGING PRIVACY SCORES

BACKGROUND

Social-networking sites have grown tremendously in popularity in recent years. Services such as FACEBOOK™ and MYSPACE™ allow millions of users to create online profiles and to share details of their personal lives with networks of friends, and often, strangers. As the number of users of these sites and the number of sites themselves explode, securing individuals' privacy to avoid threats such as identity theft and digital stalking becomes an increasingly important issue. Although all major online social networks provide at least some privacy enhancing functionalities, the majority of users typically accept the default settings (which usually means that they let their information open to the public), and do not revisit their options until damage is done. This is either due to the poor user-interface design or the common belief that sharing personal information online is more cool than harmful.

Past research on privacy and social networks mainly focuses on corporate-scale privacy concerns, i.e., how to share a social network owned by one organization without revealing the identity or sensitive relationships among the registered users. Not much attention has been given to individual users' privacy risk posed by their information-sharing activities. Indeed, many privacy schemes are based on a one-dimensional analysis of the relative sensitivity of the data. That is, for example, a birth date may be deemed sensitive or not sensitive based on a subjective evaluation of the privacy value of that data. Sensitivity may, in this example be calculated based on survey or some other tool. However, evaluating only sensitivity may not accurately account for a privacy value across a number of social groups. For the birth date example, birth date may be perceived as less private in a social dating group, where birth date may be a factor in selecting a potential matching personality. On the other hand, birth date may be perceived as very private or merely not relevant in a hobby group where birth date may have no rational connection with the activities of the group. Thus, additional dimensions for calculating privacy scores may be desirable.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for providing a privacy setting for a target user relative to relationships with a number of other users in a social network utilizing an electronic computing device are presented, the method including: causing the electronic computing device to retrieve a current privacy setting for a common profile item, where the common profile item corresponds with the target user and each of the number of other users, and where the common profile item is one of a number of common profile items; causing the electronic computing device to calculate a pseudo-common profile item sensitivity value for the common profile item based on the current privacy settings of the target user and the number of other users; causing the electronic computing device to calculate a final common profile item sensitivity value for the common profile item based on the current privacy setting, where the final common profile item sensitivity value represents a proportion of the common profile item that is shared by the target user with all other users, and where the current privacy setting represents a value corresponding with whether or not the common profile item is shared corresponding with the relationships with the number of other users; causing the electronic computing device to calculate a common profile item visibility value for the common profile item based on the current privacy setting and the final common profile item sensitivity value for the common profile item; and causing the electronic computing device to calculate the privacy score of the target user; and displaying privacy settings relative to a continuum, for allowing a user to choose a selected privacy setting such that settings for the common profile item in the social network are automatically changed to reflect the selected privacy setting. In some embodiments, methods further include: continuing the retrieving and the calculating until the final common profile item sensitivity value for each of the number of common profile items is calculated; causing the electronic computing device to calculate a partial privacy score of the target user, where the partial privacy score combines the common profile item sensitivity value and the common profile item visibility value; and continuing the retrieving and the calculating until the partial privacy score for each of the number of common profile items is calculated. In some embodiments, the privacy score of the target user is a sum of the partial privacy scores. In some embodiments, the final common profile item sensitivity value and the common profile item visibility value are based on sharing and relationships between the target user and the number of users. In some embodiments, the final common profile item sensitivity value includes at least a proportion of the common profile item that is shared by the target user with the number of users. In some embodiments, the common profile item visibility value includes a product of: the final common profile item sensitivity value; and a proportion of sharing of the number of common profile items for the target user. In some embodiments, the pseudo-common profile item sensitivity value, final common profile item sensitivity value, and the common profile item visibility value are further based on a relationship between the target user and the number of users. In some embodiments, the relationship is selected without limitation from the group consisting of: a close friend relationship, a friend relationship, a friend of a friend relationship, an acquaintance relationship, a group relationship, and a network relationship and where the relationship is assigned a numeric level. In some embodiments, the final common profile item sensitivity value includes a proportion of the common profile item that is shared by the target user the number of users with respect to the relationship between the target user and each of the number of users. In some embodiments, the common profile item visibility value includes a product of: the final common profile item sensitivity value; and a product of a proportion of sharing of the number of common profile items for the target user and the numeric level. In some embodiments, the partial privacy score is a product of the final common profile item sensitivity value and the common profile item visibility value.

In other embodiments, computing device program products for providing a privacy setting for a target user relative to relationships with a number of other users in a social network using an electronic computing device are provided, the computing device program products including: a computer readable medium; first programmatic instructions for retrieving a current privacy setting for a common profile item, where the common profile item corresponds with the target user and each of the number of other users, and where the common profile item is one of a number of common profile items; second programmatic instructions for calculating a pseudo-common profile item sensitivity value for the common profile item based on the current privacy settings of the target user and the number of other users; third programmatic instructions for calculating a final common profile item sensitivity value for the common profile item based on the current privacy setting, where the final common profile item sensitivity value represents a proportion of the common profile item that is shared by the target user with all other users, and where the current privacy setting represents a value corresponding with whether or not the common profile item is shared corresponding with the relationships with the number of other users; fourth programmatic instructions for retrieving the current privacy setting of the common profile item of the target user; fifth programmatic instructions for calculating a common profile item visibility value for the common profile item based on the current privacy setting and the final common profile item sensitivity value for the common profile item; and sixth programmatic instructions for calculating the privacy score of the target user; and seventh programmatic instructions for displaying privacy settings relative to a continuum, for allowing a user to choose a selected privacy setting such that settings for the common profile item in the social network are automatically changed to reflect the selected privacy setting. In some embodiments, computing device program products further include: continuing the retrieving and the calculating until the final common profile item sensitivity value for each of the number of common profile items is calculated; eighth programmatic instructions for calculating a partial privacy score of the target user, where the partial privacy score combines the final common profile item sensitivity value and the common profile item visibility value; and continuing the retrieving and the calculating until the partial privacy score for each of the number of common profile items is calculated.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
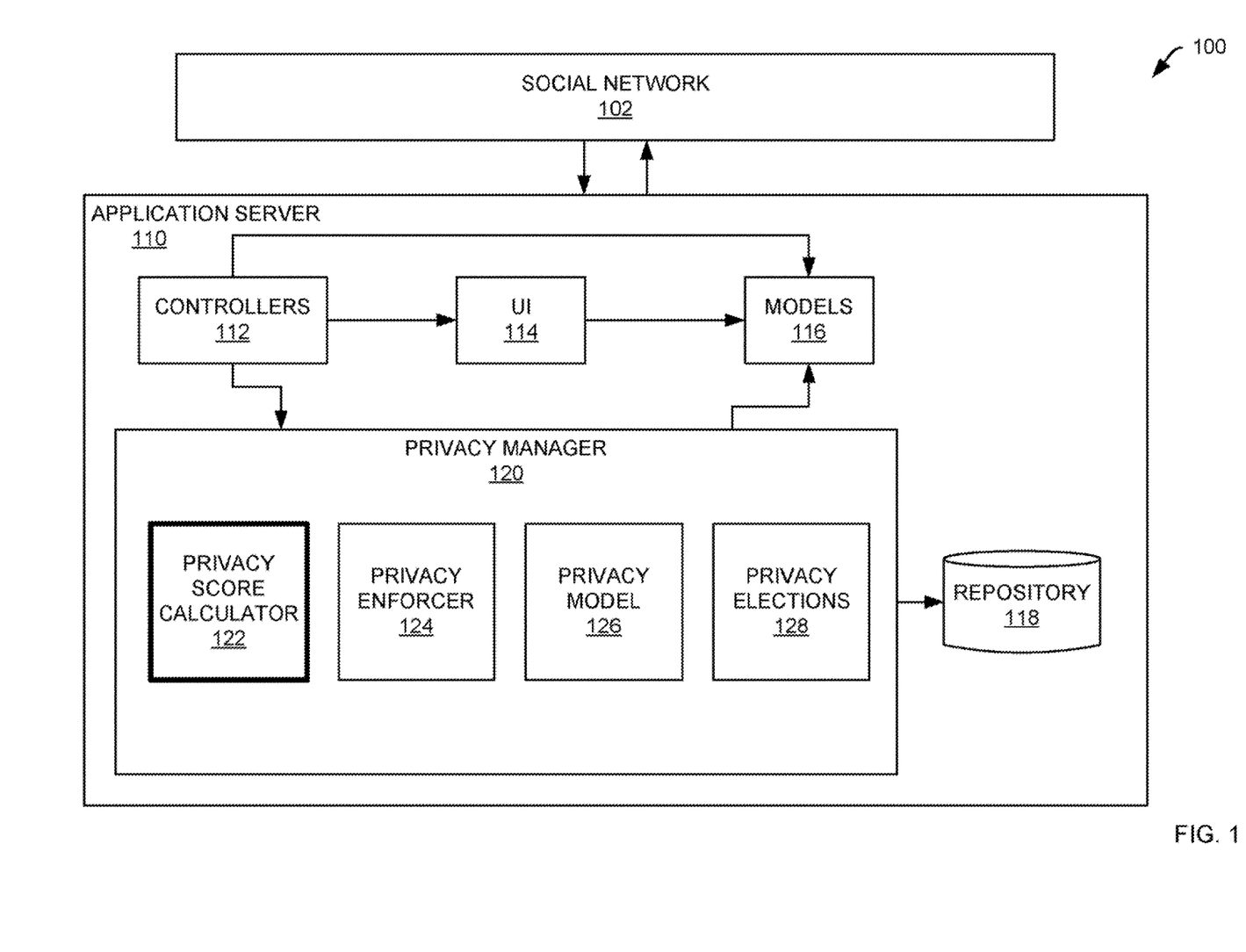
FIG. 1 is an illustrative representation of a system 100 for managing privacy settings for a social network in accordance with embodiments of the present invention.

FIG. 1 is an illustrative representation of a system 100 for managing privacy settings for a social network in accordance with embodiments of the present invention. As illustrated, social network 102 is in communication with application server 110. As may be appreciated, social network 102 may be in communication with application server 110 over a local network, a remote network, a wide area network, or any other network known in the art without limitation and without departing from the present invention. In embodiments, social networks may include without limitation: Advogato, AMIE STREET™, Anobil, ASMALLWORLD™, Athlinks, Avatars United, BADOO™, Bahi, BEBO™, BIP™, BLACKPLANET.COM™, BOOMJ.COM™, Broadcaster.com, BUZZNET™, CAFEMOM™, Cake Financial Care2 (Notice of Allowance 9/08 for Mark CARE2), CLASSMATES.COM™, Cloob, COLLEGE TONIGHT™, CouchSurfing, CozyCot, DEVIANTART™, DontStayln, Elftown, Eons.com, Espinthebottle, Experience Project, FACEPARTY™, FACES.COM™, Fetlife, FLICKR™, FLIXSTER™, FOTOLOG™, Friends United, FRIENDSTER™, Frühstückstreff, FUBAR™, GAIA ONLINE™, GAMERDNA™, GATHER™, Geni.com, gibLink.com, Goodreads, GOSSIPREPORT.COM™, Grono.net, Haboo, HI5™, HORSELAND™, THE HOSPITALITY CLUB™, HYVES™, IMEEM™, IRC, Cafeteria, ircloop, ITalki, ITSMY™, iWiW, JAIKU™, JammerDirect, kaioo, KAIXIN™, Last.fm™, LibraryThing, LIFEKNOT™, LINKEDIN™, LIVEJOURNAL™, Livemocha, LUNARSTORM™, MEETin, MEETUP™, MIGENTE. COM™, MIXI™, mobikade, MOCOSPACE™, MOG™, MULTIPLY™, Muxlim, MYCHURCH™, MYHERITAGE™, MyLOL, MYYEARBOOK™, Nasza-klasa.p, Netlog, Nettby, NEXOPIA™, NING™, Odnoklassniki.ru, OKCUPID™, OneWorldTV, OUTeverywhere, Passportstamp, Pingsta, PLAXO™, PLAYAHEAD™, Playbooy U, Plurk, quarterlife, Ravelry, ResearchGate, REUNION.COM™, Reverbnation, RYZE™, scispace.net, SHELFARI™, SKYROCK™, Sonico.com, SOUNDPEDIA™, Spoke, STICKAM™, Student.com, StudiVZ, Tagged.com, TALTOPIA™, TravBuddy.com, Travellerspoint.com, TRIBE.NET™, Trombi.com, tuenti.com, TWITTER™, V Kontakte, Vampirefreaks, Viadeo, VOX™, WASABI™, WAYN, WebBiographies, Windows Live, Spaces, WIS.DM™, WISEREARTH™, XANGA™, Xiaonei, XING™, X13™, YELP™, and Youmeo.

Application server 110 may be configured with a number of components for enabling embodiments described herein. As illustrated, application server 110 may include controllers 112 for enabling interactions between privacy manager 120, user interface (UI) 114, and models component 116. UI 114 and models component 116 may be configured to cooperatively and graphically display privacy settings as determined by privacy manager 120 on an electronic computing device. A user interface embodiment, such as may be displayed on an electronic computing device, may be configured to display current and recommended privacy settings. As such, a user may, in embodiments, utilize UI 114 to select either current privacy settings, recommended privacy settings. In addition, UI 114 may be configured to accept custom user privacy settings in some embodiments. Displaying privacy settings on an electronic computing device will be discussed in further detail below for FIGS. 5 and 7. Models component 116 may be configured to manage visualization of any discretionary privacy settings available to a user for modification utilizing embodiments described herein.

Application server 110 further includes privacy manager 120. Privacy manager 120 may include several modules for enabling embodiments described herein. Privacy score calculator module 122 may be configured to determine a number of privacy indices in response to some triggering event associated with social network 102. Furthermore, privacy score calculator module 122 may be configured to implement any range of privacy score calculations. Privacy scores indicate a level of privacy or security. As utilized herein, a privacy score is an aggregation of all attribute scores of a user or target. In embodiments, a high privacy score is indicative of high privacy risk and, therefore, a weaker privacy setting. Likewise, in embodiments, a low privacy score is indicative of low privacy risk, and therefore a more secure privacy setting. Privacy scores will be discussed in further detail below for FIG. 3. A framework for calculating privacy scores may be found in, "A Framework for Computing the Privacy Scores of Users in Online Social Networks;" Kun Liu, Evimaria Terzi, (submitted to IEEE International Conference on Data Mining, Dec. 6-9, 2009, under review), which is hereby incorporated by reference in its entirety. Privacy score calculator module 122 may be further configured to calculate a privacy index. As utilized herein, privacy indices are normalized from a summation of privacy scores of a user or target. In embodiments, a high privacy index is indicative of weaker privacy setting. Likewise, in embodiments, a low privacy index is indicative of a more secure privacy setting.

Privacy manager 120 may further include privacy enforcer module 124. In embodiments, privacy manager 120 may be configured to manage conflicts associated with accepting privacy recommendations. As may be appreciated, in utilizing embodiments described herein, conflicts may arise in managing privacy settings. For example, in a preferred embodiment, a conflict will always be resolved to a more secure privacy setting. However, in other embodiments, conflicts may be resolved in any arbitrary fashion without limitation. Privacy manager 120 may further include privacy model module 126. In embodiments privacy model module 126 may be configured to manage a user relationship. A user relationship may be utilized to determine a user relationship distance value, which may be characterized as a quantification of trust between a user and target. In some embodiments, user relationships may include without limitation: a close friend relationship, a friend relationship, a friend of a friend relationship, an acquaintance relationship, a group relationship, and a network relationship. Each of these relationships defines a level of trust. For example, a close friend relationship may be more "trustworthy" than a network relationship. Thus, a user having a close friend relationship with a first target might logically be more inclined to share more sensitive information with the first target than with a second target where the second target has a network relationship with the user.

Privacy manager 120 may further include privacy elections module 128. In embodiments, privacy elections module 128 may be configured to designate a user relationship between a user and a target. As noted above, a user relationship may be utilized to determine a user relationship distance value, which may be characterized as a quantification of trust between a user and target. Privacy elections module 128 may be configured to establish what level of relationship is appropriate. In some embodiments, privacy elections module 128 may be configured to receive input from a user. In other embodiments, privacy elections module 128 may be configured to receive input from social network 102. Privacy manager 120 may be further configured to access repository 118. Repository 118 may be configured to store non-transient data associated with privacy manager 120. In some embodiments, repository 118 may include a database that is accessible via a database management system (DBMS). In other embodiments, repository 118 may include a hardware storage medium. In still other embodiments, repository 118 may be located locally or remotely and may be accessible through any method known in the art without limitation.

Figure 2:
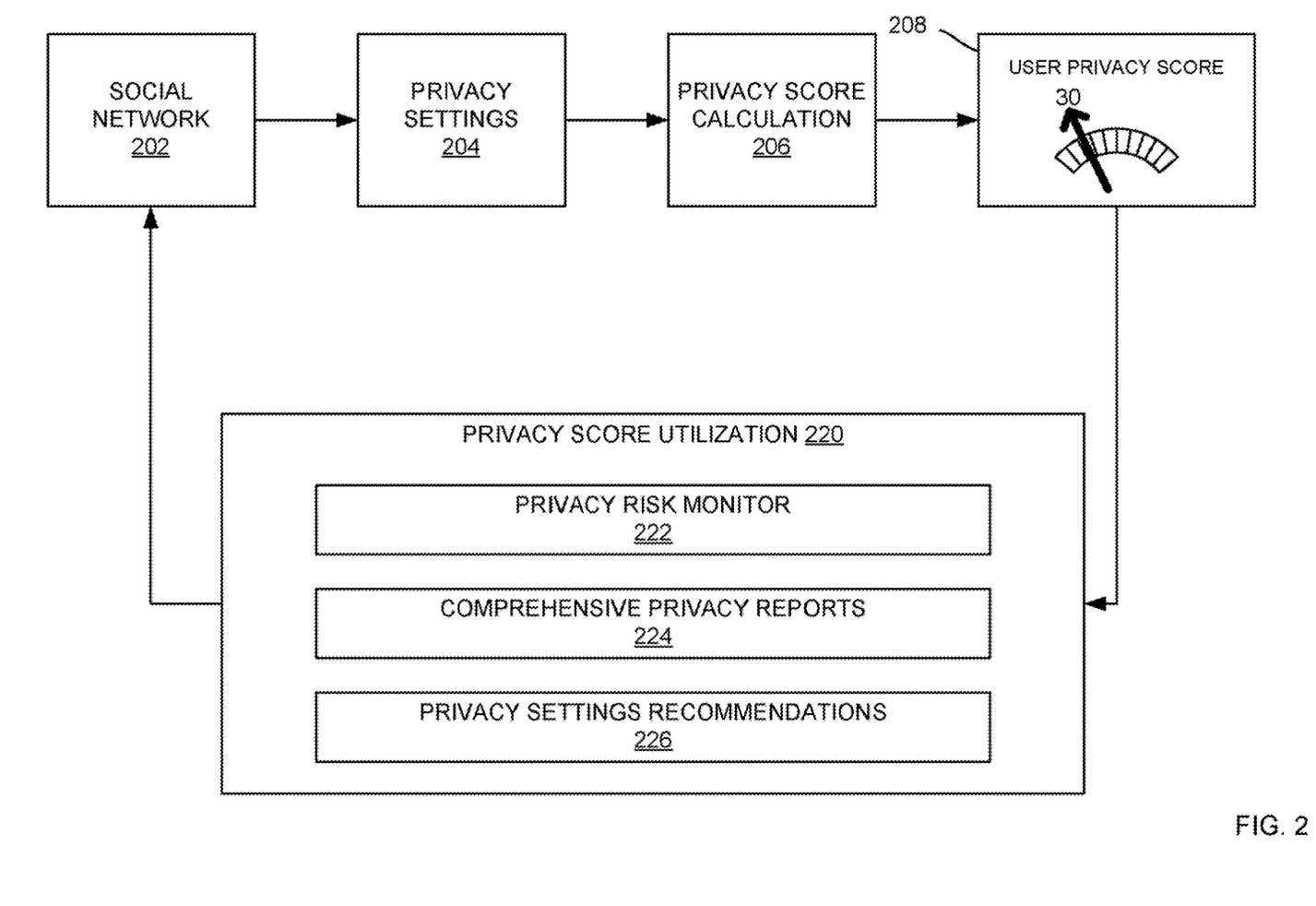
FIG. 2 is an illustrative representation of privacy score utilization context in accordance with embodiments of the present invention.

FIG. 2 is an illustrative representation of privacy score utilization context in accordance with embodiments of the present invention. As illustrated, social network 202 provides a context in which embodiments of the present invention may be utilized. Social network 202 requires, in some instances, privacy settings 204. Privacy settings configurations may vary widely across different social networks. As such, users associated with several social networking sites may experience confusion in establishing consistent privacy settings. Embodiments described herein calculate privacy scores 206 based on a target user's preference as well as other users' preferences. A privacy score may be displayed 208 to provide a target user an index for use in determining whether to change their privacy settings.

In addition to assisting users in determining privacy settings, privacy scores utilization 220 module may be provided. For example, privacy risk monitoring 222 may be configured to provide an indicator of the user's potential privacy risk. A system may estimate the sensitivity of each piece of information or profile item a user has shared, and send alert to the user if the sensitivity of some information is beyond the predefined threshold. Sensitivity of profile items will be discussed in further detail below for FIG. 3. Furthermore, comprehensive privacy reports 224 may be generated as a byproduct of embodiments utilized herein. In this example, a system may estimate the inherent attitude with respect to privacy of every individual in the network. In some examples, this psychometric byproduct may assist sociologists studying the online behaviors of people and may provide insight into developing and evolving social networking sites. Still further, privacy setting recommendations 226 provide a target user the ability to compare his privacy score with the other users in the network. By comparing privacy scores with other users, a target user may make informed decisions on how readily information is shared between users on a particular site. For example, in a case where the overall privacy risks of users' social graphs differ from that of a target user, the system can recommend stronger settings based on the information from the target's social neighbors.

Figure 3:
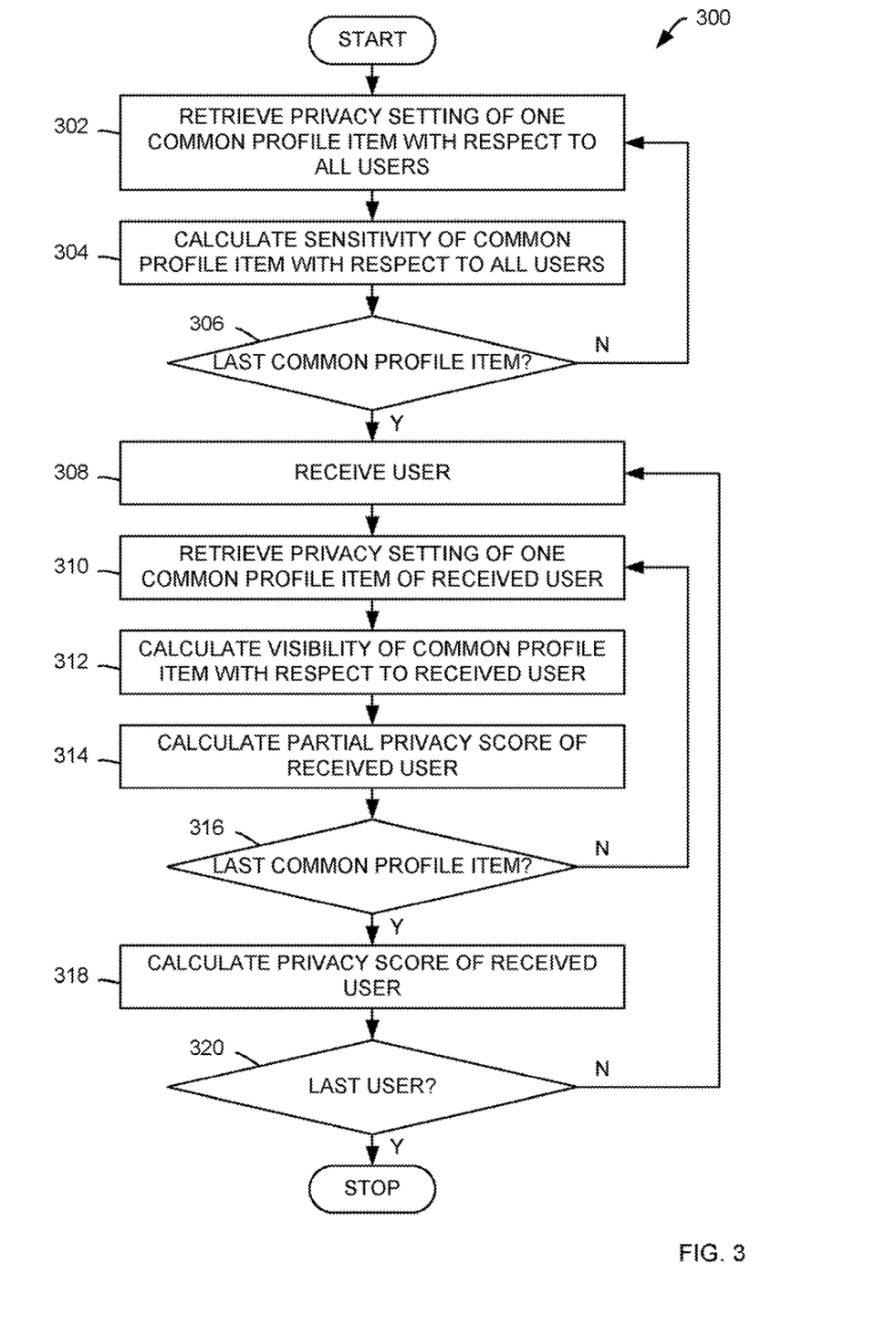
FIG. 3 is an illustrative flowchart of methods for calculating a privacy score in accordance with embodiments of the present invention.

FIG. 3 is an illustrative flowchart 300 of methods for calculating a privacy score in accordance with embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
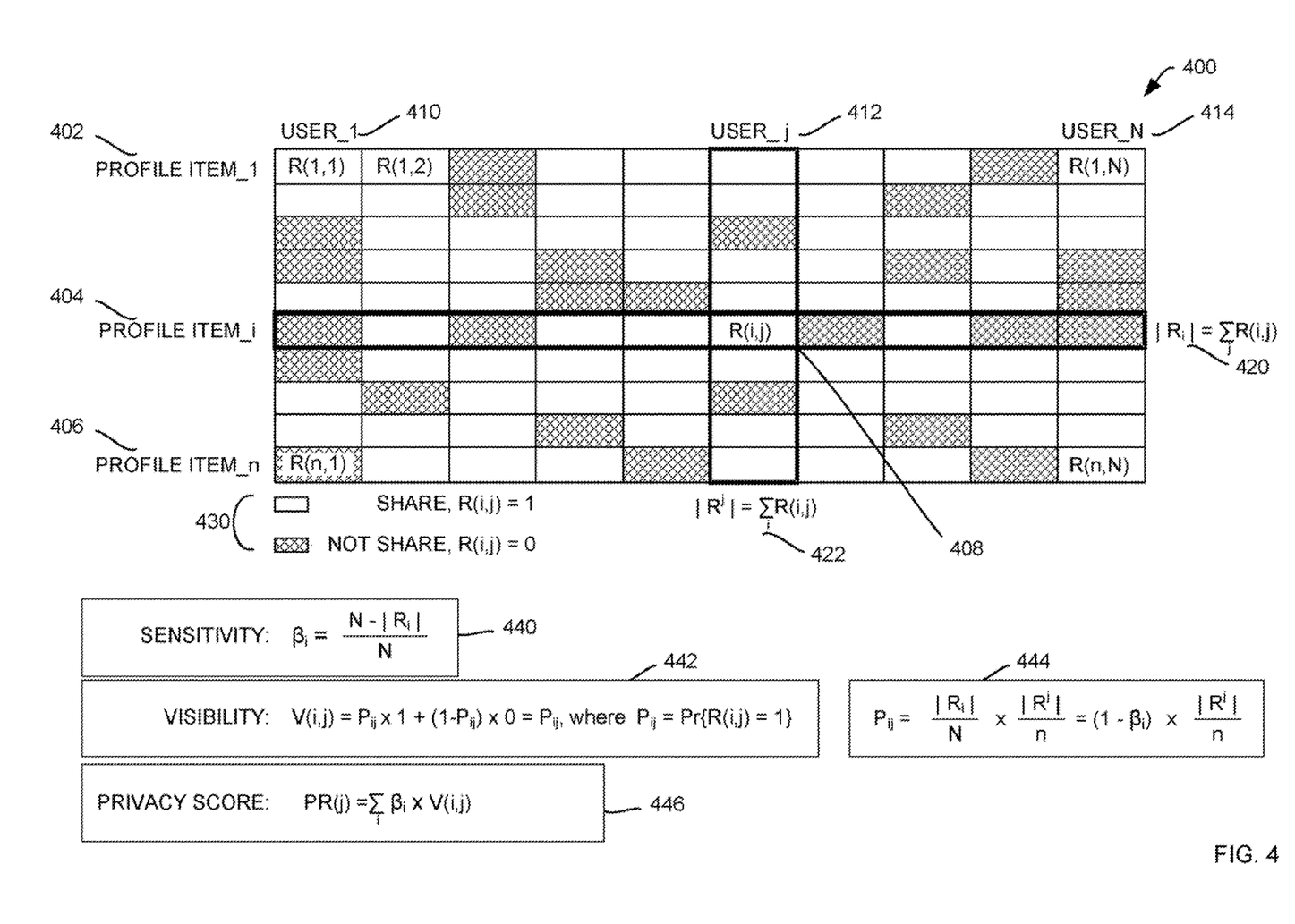
FIG. 4 is an illustrative representation of a matrix useful for calculating a privacy score in a dichotomous example in accordance with embodiments of the present invention.

At a step 302, the method retrieves current privacy settings of a common profile item with respect to all users. A common profile item is a profile item shared by all users such as, for example, birthday or hometown. Any number of common profile items may be available without departing from the present invention. Turning briefly to FIG. 4, FIG. 4 is an illustrative representation of a matrix 400 useful for calculating a privacy score in a dichotomous example in accordance with embodiments of the present invention. As may be appreciated, matrix 400 represents one method for arranging users and common profile items in no specific order for use in calculating a common profile sensitivity value and should not be construed as limiting. As illustrated, common profile items may include any number of common profile items from common profile item_1 402 to common profile item_n 406 for user_1 410 to user_N 414 without limitation. For a step 302, a common profile item_i 404 may be selected for user_j 412 at point R(i,j) 408.

At a next step 304, the method calculates a common profile sensitivity value with respect to all users. Generally, sensitivity is a measure of how private (i.e. sensitive) a particular common profile item is with respect to all other users. For example, if a common profile item is not shared across all users, it is deemed sensitive. Thus, sensitivity is based on the environment or context in which the common profile item is found. In other words, in embodiments, the common profile item sensitivity value represents a proportion of the common profile item that is shared by the target user with the other users. In other embodiments, the common profile item sensitivity value includes a proportion of the common profile item that is shared by the target user the other users with respect to a relationship between the target user and each of the plurality of users. In those embodiments, the relationship may include: a close friend relationship, a friend relationship, a friend of a friend relationship, an acquaintance relationship, a group relationship, and a network relationship. In embodiments, the relationship may be assigned a numeric level. Returning to FIG. 4, in an embodiment, a common profile item sensitivity value for common profile item R(i,j) 408 may be calculated utilizing equation 1 (440). An example matrix and accompanying calculation will be discussed in further detail below in the Example Section.

At a next step 306, the method determines whether the common profile item is the last common profile item. If the method determines at a step 306 that the common profile item is not the last common profile item, the method returns to a step 302 to retrieve another common profile item. In this manner, the method iterates until all common profile items are accounted for. If the method determines at a step 306 that the common profile item is the last common profile item, the method continues to a step 308 to receive a target user such that the target user's common profile items' visibilities may be calculated.

At a next step 310, the method retrieves a current privacy setting of the target user of a common profile item. Returning to FIG. 4, in an embodiment, a common profile item_i 404 may be selected for user_j 412 at point R(i,j) 408. At a next step 312, the method calculates a common profile item visibility value based on the current privacy setting and the common profile item sensitivity value. As such, returning to FIG. 4, a common profile item visibility value for common profile item R(i,j) 408 may be calculated utilizing equation 444. As illustrated, equation 442 is provided for use in clarifying a derivation of equation 444. That is, in an embodiment, equation 442 is a formula for computing the expected visibility, which becomes to Equation 444. It may be noted that in embodiments, the common profile item visibility value is a product of the common profile item sensitivity value and a proportion of sharing of the common profile items for the target user. It may be further noted that in embodiments, the common profile item sensitivity value and the common profile item visibility value are based on sharing between the target user and the other users. In other embodiments, the common profile item sensitivity value and the common profile item visibility value are further based on a relationship between the target user and the plurality of users. In those embodiments, the relationship may include: a close friend relationship, a friend relationship, a friend of a friend relationship, an acquaintance relationship, a group relationship, and a network relationship. In embodiments, the relationship may be assigned a numeric level. Thus, in some embodiments, the common profile item visibility value is a product of: the common profile item sensitivity value; and a product of a proportion of sharing of the common profile items for the target user and the numeric level. As noted above, an example matrix and accompanying calculation will be discussed in further detail below in the Examples Section.

At a next step 314, the method calculates a partial privacy score of the target user. In an embodiment, a partial privacy score combines the common profile item sensitivity value and a common profile item visibility value. It may be appreciated that the partial privacy score may combine the common profile item sensitivity value and the common profile item visibility value in any manner known in the art as long as the partial privacy score is monotonically increasing with both sensitivity value and visibility value without departing from the present invention. Thus, in one embodiment, the partial privacy score is a product of the common profile item sensitivity value and the common profile item visibility value. In other embodiments, the partial the partial privacy score is a sum of the common profile item sensitivity value and the common profile item visibility value.

At a next step 316, the method determines whether the common profile item is the last profile item. If the method determines at a step 316 that the common profile item is not the last common profile item, the method returns to a step 310 to retrieve a privacy setting for another common profile item. In this manner, the method may iterate through all common profile items. If the method determines at a step 316 that the common profile item is the last common profile item, the method continues to a step 318 to calculate a privacy score of the user. Returning to FIG. 4, equation 446 is provided for calculating a privacy score. Thus, in embodiments, a privacy score is a sum of the partial privacy scores calculated at a step 314. At a next step 320, the method determines whether the target user is the last user. If the method determines at a step 320 that the target user is not the last user, the method returns to a step 308 to receive another user. In this manner, the method may iterate through all users. If the method determines at a step 320 that the target user is the last user, the method ends.

Figure 5:
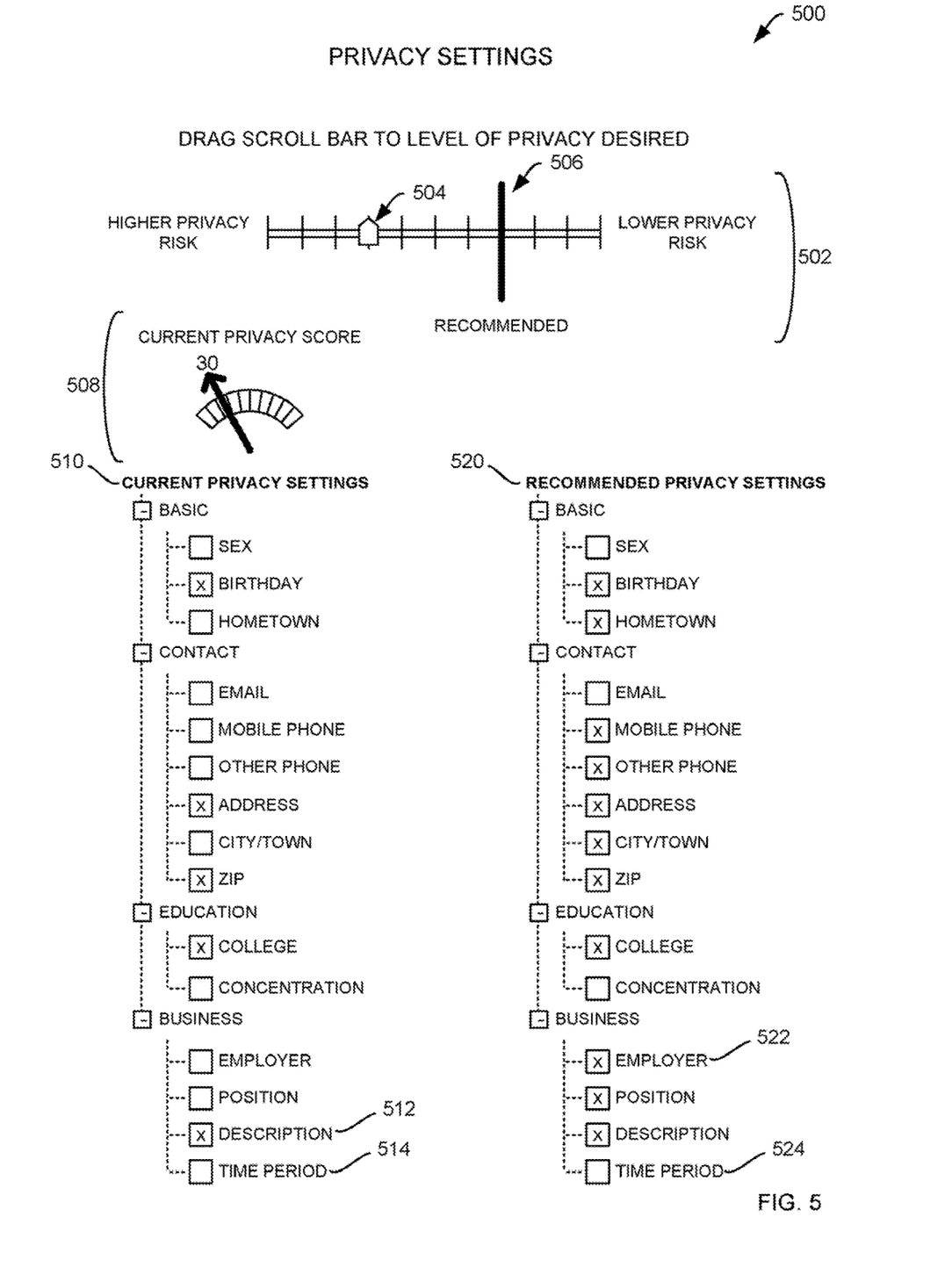
FIG. 5 is an illustrative representation of a graphical user interface (UI) utilized for managing privacy settings for a social network in accordance with embodiments of the present invention.

FIG. 5 is an illustrative representation of a graphical user interface (UI) 500 utilized for managing privacy settings for a social network in accordance with embodiments of the present invention. In particular, FIG. 5 is an illustrative embodiment of UI 114 (FIG. 1). It is noted that this illustration is presented for clarity in understanding embodiments of the present invention and should not be construed as limiting with respect to layout, design, color, or content. Indeed, any number of UIs may be presented which may be enabled for embodiments described herein. As illustrated, UI 500 may include privacy bar 502. Privacy bar 502 may be configured to indicate privacy settings relative to a continuum. In some embodiments, scroll bar 504 may be dragged only to recommended settings indicator 506. Upon dragging scroll bar 504 to recommended settings indicator 506, a user's privacy settings will be changed to reflect the recommended settings.

In some embodiments, UI 500 may include privacy graph 508. Privacy graph 508 may be utilized to easily indicate relative strength of privacy settings. In this example, privacy graph 508 indicates a privacy index of 30 out of 100, which is on a lower end of privacy indices. As noted above, in embodiments, a privacy index is a privacy score normalized to a range of approximately 0 to 100. In other embodiments, a privacy index is a privacy score normalized to a range of approximately 0 to 10. Privacy graph 508 may be further configured, in some embodiments, with color indicators indicating levels of risk. In one embodiment, red indicates a high level of risk and green indicates a low level of risk.

Further illustrated are current privacy settings 510 and recommended privacy settings 520. Privacy settings may include any number of attributes for a social network model. For example, business data attribute 512 is a description and business data attribute 514 is a time period. A checked attribute such as attribute 512 indicates that the attribute is not shared while a non-checked attribute such as attribute 514 indicates that the attribute is shared. In some embodiments, a checked attribute is shared and a non-checked attribute is not shared. Thus, checking or non-checking is merely an indication of whether or not an attribute is shared and should not be construed as limiting. In some embodiments, recommended privacy settings 520 include checked attributes such as attribute 522 which are not checked in current privacy settings. In some embodiments, recommended privacy settings 520 included non-checked attributes such as attribute 524 which are also non-checked in current privacy settings. In this manner, a user may quickly and easily determine which attributes have the same privacy settings between current and recommended privacy settings. In some embodiments, a user may select a subset of recommended privacy settings by checking or un-checking attributes on the UI.

Figure 6:
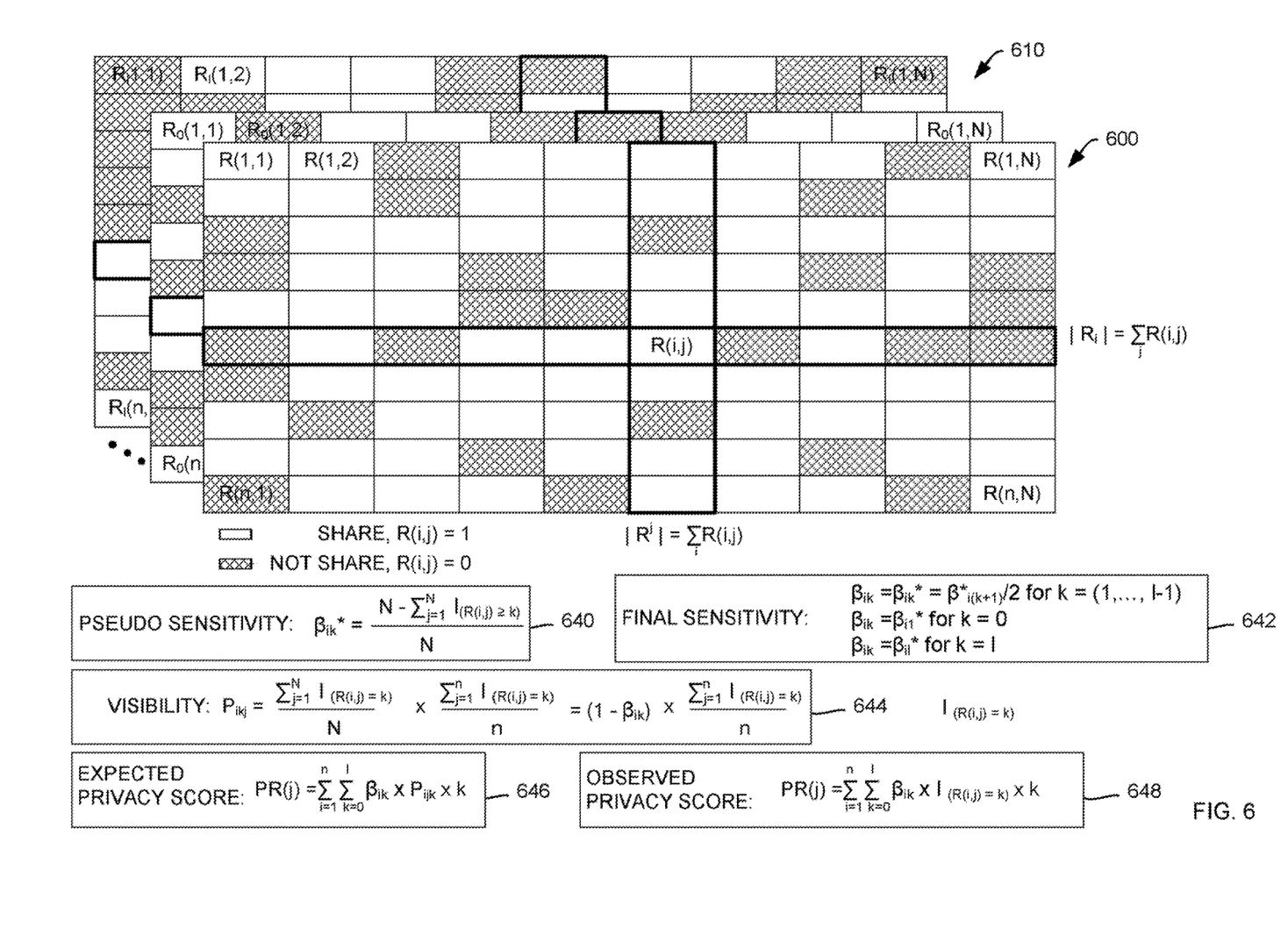
FIG. 6 is an illustrative representation of a matrix useful for calculating a privacy score in a polytomous example in accordance with embodiments of the present invention.

FIG. 6 is an illustrative representation of a matrix useful for calculating a privacy score in a polytomous example in accordance with embodiments of the present invention. In particular, FIG. 6 is representative of different relationships or levels between users and user sharing. That is, for purposes of calculating privacy scores, a matrix for each relationship may be utilized which is substantially similar in appearance and function as provided in FIG. 4. Where FIG. 4 represents a dichotomous instance, FIG. 6 represents a polytomous instance. The use of matrices 600 to 610 represent one method for arranging users and common profile items with respect to relationship (or numeric levels (1)). The illustrated matrices are arranged in no specific order for use in calculating a common profile sensitivity value and should not be construed as limiting.

Figure 7:
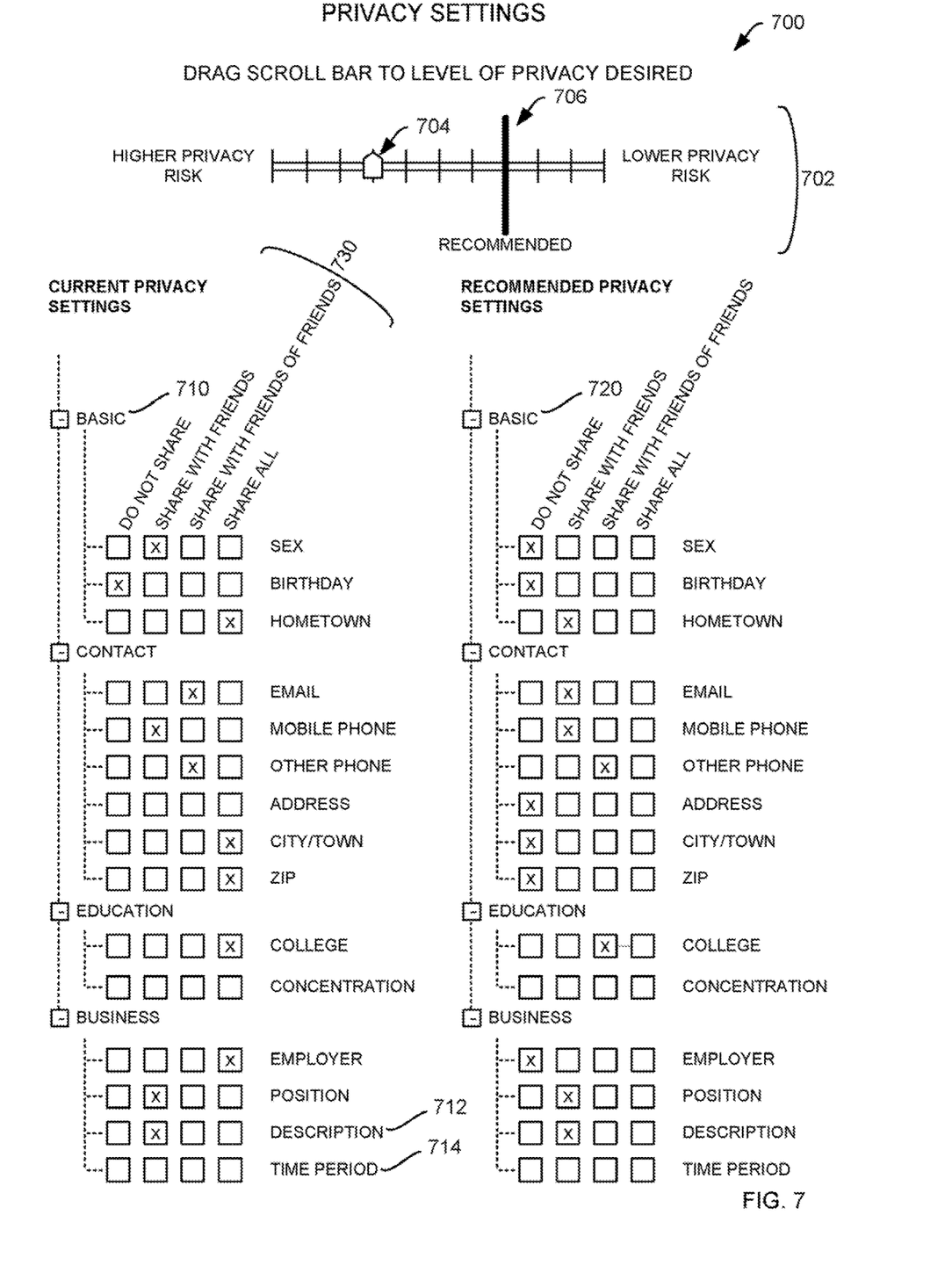
FIG. 7 is an illustrative representation of a graphical user interface (UI) utilized for managing privacy settings for a social network in accordance with embodiments of the present invention.

FIG. 7 is an illustrative representation of a graphical user interface (UI) 700 utilized for managing privacy settings for a social network in accordance with embodiments of the present invention. In particular, FIG. 7 is an illustrative embodiment of UI 114 (FIG. 1). FIG. 7 is similar in appearance to FIG. 5, but includes a relationship component as illustrated by relationship 730. Relationships may be defined in any manner without limitation and without departing from the present invention. Thus, relationship may include without limitation, a close friend relationship, a friend relationship, a friend of a friend relationship, an acquaintance relationship, a group relationship, and a network relationship. In embodiments, the relationship may be assigned a numeric level. It is further noted that this illustration is presented for clarity in understanding embodiments of the present invention and should not be construed as limiting with respect to layout, design, color, or content. Indeed, any number of UIs may be presented which may be enabled for embodiments described herein. As illustrated, UI 700 may include privacy bar 702. Privacy bar 702 may be configured to indicate privacy settings relative to a continuum. In some embodiments, scroll bar 704 may be dragged only to recommended settings indicator 706. Upon dragging scroll bar 704 to recommended settings indicator 706, a user's privacy settings will be changed to reflect the recommended settings.

In some embodiments, UI 700 may include privacy graph 708. Privacy graph 708 may be utilized to easily indicate relative strength of privacy settings. In this example, privacy graph 708 indicates a privacy index of 30 out of 100, which is on a lower end of privacy indices. As noted above, in embodiments, a privacy index is a privacy score normalized to a range of approximately 0 to 100. In other embodiments, a privacy index is a privacy score normalized to a range of approximately 0 to 10. Privacy graph 708 may be further configured, in some embodiments, with color indicators indicating levels of risk. In one embodiment, red indicates a high level of risk and green indicates a low level of risk.

Further illustrated are current privacy settings 710 and recommended privacy settings 720. Privacy settings may include any number of attributes for a social network model. For example, business data attribute 712 is a description and business data attribute 714 is a time period. An attribute may be checked or unchecked (indicating sharing or not sharing) based on relationship 730. Thus checked attribute 712 indicates that the attribute is shared with friends, but not with other relationships. In contrast, attribute 714 indicates that the attribute is shared for any relationship. It may be noted that in some embodiments, relationships may be overlapping or conflicting. For example, in one embodiment where "DO NOT SHARE" is checked, other overlapping or conflicting boxes may not be selectable. In another embodiment where "SHARE ALL" is checked, other overlapping or conflicting boxes may not be selectable. In some embodiments, a checked attribute is shared and a non-checked attribute is not shared. Thus, checking or non-checking is merely an indication of whether or not an attribute is shared and should not be construed as limiting. In some embodiments, recommended privacy settings 720 include checked attributes which are not checked in current privacy settings. In some embodiments, recommended privacy settings 720 included non-checked attributes which are also non-checked in current privacy settings. In this manner, a user may quickly and easily determine which attributes have the same privacy settings between current and recommended privacy settings. In some embodiments, a user may select a subset of recommended privacy settings by checking or un-checking attributes on the UI.

EXAMPLES SECTION

Examples are provided herein for clarity in understanding embodiments of the present invention and should not be construed as limiting.

Dichotomous Example

TABLE 1

|  | USER 1 | USER 2 | USER 3 |  |
|---|---|---|---|---|
| COMMON PROFILE ITEM 1 | 1 | 1 | 1 | $\|R_1\| = 3$ |
| COMMON PROFILE ITEM 2 | 0 | 1 | 1 | $\|R_2\| = 2$ |
| COMMON PROFILE ITEM 3 | 0 | 0 | 1 | $\|R_3\| = 1$ |
|  | $\|R^1\| = 1$ | $\|R^2\| = 2$ | $\|R^3\| = 3$ |  |

In the illustrated table, common profile items are listed along the vertical axis while users are listed along the horizontal axis. Boxes having a "1" are considered shared. Boxes having a "0" are considered not shared. The equations along the bottom of the table are the sums of each columns namely $|R^j|$ (see FIG. 4 (422)). The equations along the side of the table are the sums of each row namely $|R_i|$ (see FIG. 4 (420)).

Utilizing equation 440 (FIG. 4), common profile sensitivity values may be calculated utilizing equation:

$$\beta_i = (N - |R_i|)/N$$

Thus, $\beta_1 = (3-3)/3 = 0$;

$\beta_2 = (3-2)/3 = \frac{1}{3}$; and $\beta_3 = (3-1)/3 = \frac{2}{3}$.

In this example COMMON PROFILE ITEM 3 is the most sensitive common profile item as indicated by $\beta_3$.

Utilizing equation 444 (FIG. 4), common profile visibility values may be calculated utilizing equation:

$$P_{ij}=(1-\beta_i)\times|R^j|/n.$$

Thus, $V_{11}=(1-0)\times\frac{1}{3}=\frac{1}{3}$;

$V_{21}=(1-\frac{1}{3})\times\frac{1}{3}=\frac{2}{9}$; and $V_{31}=(1-\frac{2}{3})\times\frac{1}{3}=\frac{1}{9}$.

In this example, among all the common profile items that belong to USER 1, $V_{11}$ is the most visible item.

Utilizing equation 446 (FIG. 4) a partial privacy score and subsequent privacy score may then be calculated utilizing equation:

$$PR(j) = \sum_{i=1}^{n}\beta_i \times V_{ij} = \sum_{i=1}^{n}\beta_i \times P_{ij}$$

Thus, $PR(1)=0\times\frac{1}{3}+\frac{1}{3}\times\frac{2}{9}+\frac{2}{3}\times\frac{1}{9}=0.1481$. This is the privacy score of USER 1. In some embodiments, a privacy score of USER 1 based on an observed visibility may be calculated. Thus, $V_{11}=1$ (because user 1 shared common profile item 1);

$V_{21}=0$ (because user 1 did not shared common profile item 2); and $V_{31}=0$ (because user 1 did not shared common profile item 3).

$$PR(1) = PR(j) = \sum_{i=1}^{n}\beta_i \times V_{ij} = 0 \times 1 + 1/3 \times 0 + 2/3 \times 0 = 0$$

Polytomous Example

As noted above, a polytomous example is one in which privacy scores are calculated with respect to a relationship. Further, as noted above, in embodiments, relationships may be assigned a numeric value for use in calculating privacy scores. In this example, a table having several levels of relationships may be transformed into three dichotomous tables. That is:

TABLE 2

|  | USER 1 | USER 2 |
|---|---|---|
| COMMON PROFILE ITEM 1 | 1 | 2 |
| COMMON PROFILE ITEM 2 | 0 | 1 |

Becomes:

TABLE 3

Matrix$_0$

|  | USER $1_0$ | USER $2_0$ |  |
|---|---|---|---|
| COMMON PROFILE ITEM $1_0$ | 1 | 1 | $|R_1| = 2$ |
| COMMON PROFILE ITEM $2_0$ | 1 | 1 | $|R_2| = 2$ |
|  | $|R^1| = 2$ | $|R^2| = 2$ |  |

TABLE 4

Matrix$_1$

|  | USER $1_1$ | USER $2_1$ |  |
|---|---|---|---|
| COMMON PROFILE ITEM $1_1$ | 1 | 1 | $|R_1| = 2$ |
| COMMON PROFILE ITEM $2_1$ | 0 | 1 | $|R_2| = 1$ |
|  | $|R^1| = 1$ | $|R^2| = 2$ |  |

TABLE 5

Matrix$_2$

|  | USER $1_2$ | USER $2_2$ |  |
|---|---|---|---|
| COMMON PROFILE ITEM $1_2$ | 0 | 1 | $|R_1| = 1$ |
| COMMON PROFILE ITEM $2_2$ | 0 | 0 | $|R_2| = 0$ |
|  | $|R^1| = 0$ | $|R^2| = 1$ |  |

In the illustrated table, common profile items are listed along the horizontal axis while users are listed along the vertical axis. Boxes having a "1" are considered shared. Boxes having a "0" are considered not shared. The equations along the bottom of the table are the sums of each columns namely $|R^j|$ (see also FIG. 6). The equations along the side of the table are the sums of each row namely $|R_j|$ (see also FIG. 6). Additionally, for purposes of the transformation, the following rules may be followed:

1) An entry in Matrix$_0$ is equal to 1, if and only if the corresponding entry in the original Matrix is greater than or equal to 0;
2) An entry in Matrix$_1$ is equal to 1, if and only if the corresponding entry in the original Matrix is greater than or equal to 1; and
3) An entry in Matrix$_2$ is equal to 1, if and only if the corresponding entry in the original Matrix is greater than or equal to 2.

Utilizing equation 640 (FIG. 6), pseudo-common profile sensitivity values may be calculated utilizing equation:

$$\beta_{ik}^{*} = \frac{N - \sum_{j=1}^{N}I_{(R(i,j)\geq k)}}{N}$$

Accordingly, a final common sensitivity value of item 1 with respect to levels 0, 1, and 2 becomes correspondingly:

$\beta_{10}=\beta_{11}^{*}=0$;

$\beta_{11}=(\beta_{11}^{*}+\beta_{12}^{*})/2=(0+\frac{1}{2})/2=\frac{1}{4}$; and $\beta_{12}=\beta_{12}^{*}=\frac{1}{2}$ (see 642 FIG. 6).

Additionally, a final common sensitivity value of item 2 with respect to levels 0, 1, and 2 becomes correspondingly:

$B_{20}=\beta_{21}^{*}\frac{1}{2}$;

$B_{21}=(\beta_{21}^{*}\beta_{22}^{*})/2=(\frac{1}{2}+1)/2=\frac{3}{4}$; and $B_{22}=\beta_{22}^{*}=1$.

Utilizing equation 644 (FIG. 6), common profile visibility values may be calculated utilizing equation:

$$P_{ikj} = \frac{\sum_{j=1}^{N} I_{(R(i,j)=k)}}{N} \times \frac{\sum_{j=1}^{n} I_{(R(i,j)=k)}}{n}$$

Thus, the common visibility value of item 1 belonging to user 1 with respect to levels 0, 1, and 2 becomes correspondingly:

$V_{110} = P_{110} * 0 = (0 * \frac{1}{2}) * 0 = 0;$ $V_{111} = P_{111} * 1 = (\frac{1}{2} * \frac{1}{2}) * 1 = \frac{1}{4};$ and $V_{112} = P_{112} \times 2 = (\frac{1}{2} * 0) * 2 = 0.$ It may be noted that this is the expected visibility of item 1.

Thus, the common visibility value of item 2 belonging to user 1 with respect to levels 0, 1, and 2 becomes correspondingly:

$V_{210} = P_{210} * 0 = (\frac{1}{2} * \frac{1}{2}) * 0 = 0;$ $V_{211} = P_{211} * 1 = (\frac{1}{2} * \frac{1}{2}) * 1 = \frac{1}{4};$ and $V_{212} = P_{212} \times 2 = (0 *) * 2 = 0.$ Utilizing equation 646 (FIG. 6), an expected privacy score for user 1 may be calculated utilizing equation:

$$PR(j) = \sum_{i=1}^{n} \sum_{k=0}^{l} \beta_{ik} \times V_{ijk} = \sum_{i=1}^{n} \sum_{k=0}^{l} \beta_{ik} \times P_{ijk} \times k$$

Thus, the expected privacy score for user 1 is:

$PR(1) = \beta_{10}*V_{110}+\beta_{11}*V_{111}+\beta_{12}*V_{112}+\beta_{20}*V_{210}+\beta_{21}*V_{211}\beta_{22}*V_{212}=0*0+\frac{1}{4}*\frac{1}{4}+\frac{1}{2}*0+\frac{1}{2}*0+\frac{3}{4}*\frac{1}{4}+1*0=\mathbf{0.25}$ It may be appreciated that an expected privacy score for user 2 may be calculated in like manner.

Utilizing equation 648 (FIG. 6), an observed privacy score for user 2 may be calculated utilizing equation:

$$PR(j) = \sum_{i=1}^{n} \sum_{k=0}^{l} \beta_{ik} \times V_{ijk} = \sum_{i=1}^{n} \sum_{k=0}^{l} \beta_{ik} \times I_{(R(i,j)=k)} \times k$$

Thus, the observed privacy score for user 2 is:

$PR(2) =$ $\beta_{10}*V_{120}+\beta_{11}*V_{121}+\beta_{12}*V_{112}+\beta_{20}*V_{220}+\beta_{21}*V_{221}+\beta_{22}*V_{222} =$ $0*0+1/4*0+1/2*2+1/2*0+3/4*1+1*0=1.75$ It may be appreciated that an observed privacy score for user 1 may be calculated in like manner. It may be further appreciated the above examples are provided herein for clarity in understanding embodiments of the present invention and should not be construed as limiting.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for providing a privacy setting for a target user relative to relationships with a plurality of other users in a social network utilizing an electronic computing device, the method comprising:
    causing the electronic computing device to retrieve a current privacy setting for a common profile item, wherein the common profile item corresponds with the target user and each of the plurality of other users, and wherein the common profile item is one of a plurality of common profile items;
    causing the electronic computing device to calculate a pseudo-common profile item sensitivity value for the common profile item based on the current privacy settings of the target user and the plurality of other users;
    causing the electronic computing device to calculate a final common profile item sensitivity value for the common profile item based on the current privacy setting, wherein the final common profile item sensitivity value represents a proportion of the common profile item that is shared by the target user with all other users, and wherein the current privacy setting represents a value corresponding with whether or not the common profile item is shared corresponding with the relationships with the plurality of other users;
    causing the electronic computing device to calculate a common profile item visibility value for the common profile item based on the current privacy setting and the final common profile item sensitivity value for the common profile item; and
    causing the electronic computing device to calculate the privacy score of the target user; and
    displaying privacy settings relative to a continuum, for allowing a user to choose a selected privacy setting such that settings for the common profile item in the social network are automatically changed to reflect the selected privacy setting.

2. The method of claim 1, further comprising:
    continuing the retrieving and the calculating until the final common profile item sensitivity value for each of the plurality of common profile items is calculated;
    causing the electronic computing device to calculate a partial privacy score of the target user, wherein the partial privacy score combines the common profile item sensitivity value and the common profile item visibility value; and
    continuing the retrieving and the calculating until the partial privacy score for each of the plurality of common profile items is calculated.

3. The method of claim 2, wherein the privacy score of the target user is a sum of the partial privacy scores.

4. The method of claim 1, wherein the final common profile item sensitivity value and the common profile item visibility value are based on sharing and relationships between the target user and the plurality of users.

5. The method of claim 4, wherein the final common profile item sensitivity value comprises at least a proportion of the common profile item that is shared by the target user with the plurality of users.

6. The method of claim 5, wherein the common profile item visibility value comprises a product of:
   a) the final common profile item sensitivity value; and
   b) a proportion of sharing of the plurality of common profile items for the target user.

7. The method of claim 4, wherein the pseudo-common profile item sensitivity value, final common profile item sensitivity value, and the common profile item visibility value are further based on a relationship between the target user and the plurality of users.

8. The method of claim 7, wherein the relationship is selected without limitation from the group consisting of: a close friend relationship, a friend relationship, a friend of a friend relationship, an acquaintance relationship, a group relationship, and a network relationship and wherein the relationship is assigned a numeric level.

9. The method of claim 8, wherein the final common profile item sensitivity value comprises a proportion of the common profile item that is shared by the target user the plurality of users with respect to the relationship between the target user and each of the plurality of users.

10. The method of claim 9, wherein the common profile item visibility value comprises a product of:
    a) the final common profile item sensitivity value; and
    b) a product of a proportion of sharing of the plurality of common profile items for the target user and the numeric level.

11. The method of claim 2, wherein the partial privacy score is a product of the final common profile item sensitivity value and the common profile item visibility value.

12. A computing device program product for providing a privacy setting for a target user relative to relationships with a plurality of other users in a social network using an electronic computing device, the computing device program product comprising:
    a computer readable medium;
    first programmatic instructions for retrieving a current privacy setting for a common profile item, wherein the common profile item corresponds with the target user and each of the plurality of other users, and wherein the common profile item is one of a plurality of common profile items;
    second programmatic instructions for calculating a pseudo-common profile item sensitivity value for the common profile item based on the current privacy settings of the target user and the plurality of other users;
    third programmatic instructions for calculating a final common profile item sensitivity value for the common profile item based on the current privacy setting, wherein the final common profile item sensitivity value represents a proportion of the common profile item that is shared by the target user with all other users, and wherein the current privacy setting represents a value corresponding with whether or not the common profile item is shared corresponding with the relationships with the plurality of other users;
    fourth programmatic instructions for retrieving the current privacy setting of the common profile item of the target user;
    fifth programmatic instructions for calculating a common profile item visibility value for the common profile item based on the current privacy setting and the final common profile item sensitivity value for the common profile item;
    sixth programmatic instructions for calculating the privacy score of the target user; and
    seventh programmatic instructions for displaying privacy settings relative to a continuum, for allowing a user to choose a selected privacy setting such that settings for the common profile item in the social network are automatically changed to reflect the selected privacy setting.

13. The computing device program product of claim 12, further comprising:
    continuing the retrieving and the calculating until the final common profile item sensitivity value for each of the plurality of common profile items is calculated;
    eighth programmatic instructions for calculating a partial privacy score of the target user, wherein the partial privacy score combines the final common profile item sensitivity value and the common profile item visibility value; and
    continuing the retrieving and the calculating until the partial privacy score for each of the plurality of common profile items is calculated.

14. The computing device program product of claim 13, wherein the privacy score of the target user is a sum of the partial privacy scores.

15. The computing device program product of claim 12, wherein the final common profile item sensitivity value and the common profile item visibility value are based on sharing between the target user and the plurality of users.

16. The computing device program product of claim 15, wherein the final common profile item sensitivity value comprises a proportion of the common profile item that is shared by the target user with the plurality of users.

17. The computing device program product of claim 16, wherein the common profile item visibility value comprises a product of:
    a) the final common profile item sensitivity value; and
    b) a proportion of sharing of the plurality of common profile items for the target user.

18. The computing device program product of claim 15, wherein the pseudo-common profile item sensitivity value, final common profile item sensitivity value, and the common profile item visibility value are further based on a relationship between the target user and the plurality of users.

19. The computing device program product of claim 18, wherein the relationship is selected without limitation from the group consisting of: a close friend relationship, a friend relationship, a friend of a friend relationship, an acquaintance relationship, a group relationship, and a network relationship and wherein the relationship is assigned a numeric level.

20. The computing device program product of claim 19, wherein the final common profile item sensitivity value comprises a proportion of the common profile item that is shared by the target user the plurality of users with respect to the relationship between the target user and each of the plurality of users.

* * * * *